United States Patent [19]
Koller et al.

[11] Patent Number: 4,736,400
[45] Date of Patent: Apr. 5, 1988

[54] DIFFUSION BONDED X-RAY TARGET

[75] Inventors: Thomas J. Koller, Shelton, Conn.; Steven Tavoletti, Rye Brook, N.Y.

[73] Assignee: The Machlett Laboratories, Inc., Stamford, Conn.

[21] Appl. No.: 817,692

[22] Filed: Jan. 9, 1986

[51] Int. Cl.⁴ .............................................. H01J 35/26
[52] U.S. Cl. .................... 378/125; 378/121; 378/144; 228/263.19
[58] Field of Search ............... 378/121, 125, 143, 144; 228/115, 128, 173.1–173.2, 194, 212, 221, 263.19

[56] References Cited

U.S. PATENT DOCUMENTS

| | | | |
|---|---|---|---|
| Re. 31,560 | 4/1984 | Devine, Jr. ........................ | 378/144 |
| 2,480,351 | 8/1949 | Anderson . | |
| 2,570,770 | 10/1951 | Combee . | |
| 2,720,575 | 10/1955 | Potter . | |
| 2,754,168 | 7/1956 | Atlee . | |
| 3,259,971 | 7/1966 | Gagola et al. .................. | 228/194 |
| 3,496,630 | 2/1970 | Duff et al. ...................... | 228/263.19 |
| 3,819,968 | 6/1974 | Haberrecker . | |
| 3,836,803 | 9/1974 | Dietz . | |
| 3,935,986 | 2/1976 | Lattari et al. ................... | 228/194 |
| 3,969,131 | 7/1976 | Fatzer . | |
| 4,004,174 | 1/1977 | Yashiro . | |
| 4,063,124 | 12/1977 | Appelt . | |
| 4,097,759 | 6/1978 | Furbee . | |
| 4,097,760 | 6/1978 | Cinelli . | |
| 4,115,718 | 9/1978 | Eggelsmann . | |
| 4,141,606 | 2/1979 | Yamamura . | |
| 4,166,231 | 8/1979 | Braun . | |
| 4,252,263 | 2/1981 | Houston . | |
| 4,255,685 | 3/1981 | Friedel . | |
| 4,271,372 | 6/1981 | Geldner . | |
| 4,276,493 | 6/1981 | Srinivasa et al. ............... | 378/144 |
| 4,327,305 | 4/1982 | Weber . | |
| 4,335,327 | 6/1982 | Waugh . | |
| 4,336,476 | 6/1982 | Holland . | |
| 4,367,556 | 1/1983 | Hübner et al. .................. | 378/144 |
| 4,480,165 | 10/1984 | Haushalter . | |
| 4,481,655 | 11/1984 | Annis et al. .................... | 378/144 |
| 4,520,496 | 5/1985 | Schreiber et al. ............... | 378/144 |
| 4,574,388 | 3/1986 | Port et al. ...................... | 378/144 |
| 4,583,243 | 4/1986 | Diemer et al. .................. | 378/121 |
| 5,519,093 | 5/1985 | Kurihara . | |

FOREIGN PATENT DOCUMENTS

| | | | |
|---|---|---|---|
| 0169117 | 1/1986 | European Pat. Off. ............ | 378/125 |
| 2215370 | 10/1973 | Fed. Rep. of Germany ...... | 378/133 |
| 1598193 | 8/1970 | France ............................ | 228/263.19 |
| 0095051 | 6/1982 | Japan .............................. | 378/144 |
| 0119142 | 7/1983 | Japan .............................. | 378/144 |
| 0142750 | 8/1983 | Japan .............................. | 378/125 |
| 0167086 | 10/1983 | Japan .............................. | 228/194 |

OTHER PUBLICATIONS

Metals Handbook, Eighth Edition, vol. 1, published by the American Society for Metals, 1961, pp. 30, 46–47.

Primary Examiner—Craig E. Church
Assistant Examiner—John C. Freeman
Attorney, Agent, or Firm—Richard M. Sharkansky

[57] ABSTRACT

A rotatable x-ray target assembly and process for manufacturing the same is provided for an x-ray tube. The x-ray target assembly comprises an x-ray target member having an opening disposed therethrough and a support member having: a mounting surface disposed transversely to the axis of rotation, a lower surface of the target member being disposed on the mounting surface; and, a threaded stem extending from said mounting surface through the opening of the target member. The support member also comprises a nut adapted to receive the threaded stem, the nut engaging an upper surface of the target member. The target member is secured to the support member by brazing material disposed between the lower surface of the target member and the mounting surface, a first portion of the brazing material being diffused into the target member and a second portion of the brazing material being diffused into the mounting surface of the support member. With such arrangement, the target member is structurally bonded to the support member. Thus, the target member is substantially prevented from slipping on the support member during the rotation of the x-ray target member during operation of the x-ray tube, thereby preventing the target member from becoming imbalanced on the support member and substantially eliminating vibration of the target member during rotation.

17 Claims, 2 Drawing Sheets

DIFFUSION BONDED X-RAY TARGET

BACKGROUND OF THE INVENTION

This invention relates generally to x-ray tubes and more particularly to x-ray tubes having a rotating x-ray target.

As is known in the art, x-ray tubes have a wide variety of applications and constructions. In one type of x-ray tube, a high-energy electron beam is emitted by a heated-filament cathode and focused onto an x-ray emissive region of an anode. The x-ray emissive region comprises a material, such as a tungsten-rhenium alloy, which emits x-rays in response to the incidence of such focused electron beam thereon. Hence, the anode is commonly referred to as the x-ray target. The incidence of the high-energy electron beam on the x-ray target generates a large amount of heat in the target which is deleterious to the target structure and hence to the operation of the x-ray tube. Hence, in conventional x-ray tubes of this type, the target anode comprises a member, such as a disk, which is mounted on a supporting shaft and rotated by a motor. The disk and supporting shaft are typically made of a high-melting-temperature metal alloy, such as titanium-zirconium-molybdenum (TZM). The electron beam is focused onto a focal track, an annular portion of a surface of the disk comprising the tungsten-rhenium x-ray emissive material. The motor rotates the target disk at high speeds, for example 10,000 RPM, thereby rotating portions of the focal track into and out of the path of the focused electron beam. The electron beam therefore is incident on only a portion of the x-ray emissive focal track at a time, allowing the remainder of the focal track to cool during the time taken to rotate such portions back into the path of the focused electron beam.

In conventional x-ray tubes, the supporting shaft comprises a flanged mounting member with a threaded stem projecting therefrom. The stem fits through an opening disposed in the center of the target disk, such disk engaging a surface of the flanged mounted member. The TZM x-ray target disk is secured to the TZM supporting shaft by clamping the disk against the flanged mounting member with a TZM nut threaded onto the stem. The target disk is then dynamically balanced on the shaft, for example by shifting weights on the underside of the disk or removing small amounts of material from the underside of the disk. While the above-described securing arrangement has performed satisfactory in some applications, in other applications the target disk has been found to slip on the supporting shaft due to the high speed rotation of the disk, thereby causing the target disk to become unbalanced on the shaft. Consequently, the unbalanced target disk vibrates during rotation, such vibration often becoming so pronounced as to destroy the x-ray tube.

In another conventional x-ray tube, the stem of the supporting shaft is unthreaded and is made from material other than TZM, such as niobium (also referred to as columbium). During manufacture, the stem and target disk are heated, thereby diffusion bonding the target to the stem and hence to the supporting shaft. While such mounting method functions satisfactorily in some applications, a stem made from material such as niobium is weaker than a stem fabricated from a refractory metal alloy, such as TZM, especially in the high temperatures commonly encountered during x-ray tube operation. Hence, at such high temperatures the diffusion bond between the stem and target disk is relatively weak, often resulting in the above-described slippage of the target on the supporting shaft, with accompanying target imbalance and vibration. Additionally, it is noted that the stress put on the diffusion bond between the stem and the target disk is tension or compression stress, which is the most destructive type of mechanical stress for a diffusion bond. Further, through extended use the size of the opening in the target disk through which the niobium stem fits expands slightly. Such expansion puts additional tension stress on the diffusion bond between the niobium stem and the target disk.

SUMMARY OF THE INVENTION

In accordance with the present invention, a process is provided for securing an x-ray target member to a support member, comprising the steps of: disposing a brazing material at an interface between a first surface of the support member and a first surface of the target member, such brazing material having a melting temperature lower than the melting temperatures of the target member and the support member; and, diffusing the brazing material into the first surface of the target member and the first surface of the support member at a temperature below the melting temperature of the brazing material. With such process, the target member is structurally bonded to the support member, forming a single composite structure. Thus, the target member is substantially prevented from slipping on the support member during rotation of the x-ray target member. The brazing material may comprise alloys of palladium, nickel or cobalt. The target member and support member may comprise a refractory metal or alloy thereof, such as titanium-zirconium-molybdenum (TZM).

In a preferred embodiment of the present invention, a process is provided for bonding an x-ray target member to a transverse mounting surface of a supporting shaft, comprising the steps of: disposing a brazing material on the mounting surface; placing the target member on the brazing material and the mounting surface; and, diffusing the brazing material into the mounting surface and the target member by securing the target member against the brazing material and the mounting surface and heating the target member, with the target member expanding against the brazing material and the mounting surface. Since the diffusion bond is formed between surfaces disposed transversely to the supporting shaft (and hence transversely to the axis of rotation of the target member), the stress put on such diffusion bond is shear stress, which is less destructive to the diffusion bond than is tension or compression stress.

According to the invention, an x-ray tube is provided comprising an x-ray target assembly rotatable about an axis of rotation. The rotatable target assembly comprises an x-ray target member and means for supporting the x-ray target member. The target member is balanced on the supporting means. Means are further provided for securing the target member to the supporting means, the securing means comprising a brazing material disposed at an interface between a first surface of the target member and a first surface of the supporting means, a first portion of the brazing material being diffused into the first surface of the target member and a second portion of the brazing material being diffused into the first surface of the supporting means. With such arrangement, the target member is substantially prevented from slipping on the supporting member during rotation of the x-ray assembly, thereby preventing the target member from becoming imbalanced on the support member and thus substantially eliminating vibration of the target member during rotation.

BRIEF DESCRIPTION OF THE DRAWINGS

The foregoing features of the present invention and the advantages thereof may be fully understood from the following detailed specification read in conjunction with the accompanying drawings wherein.

DESCRIPTION OF THE PREFERRED EMBODIMENTS

Figure 1:
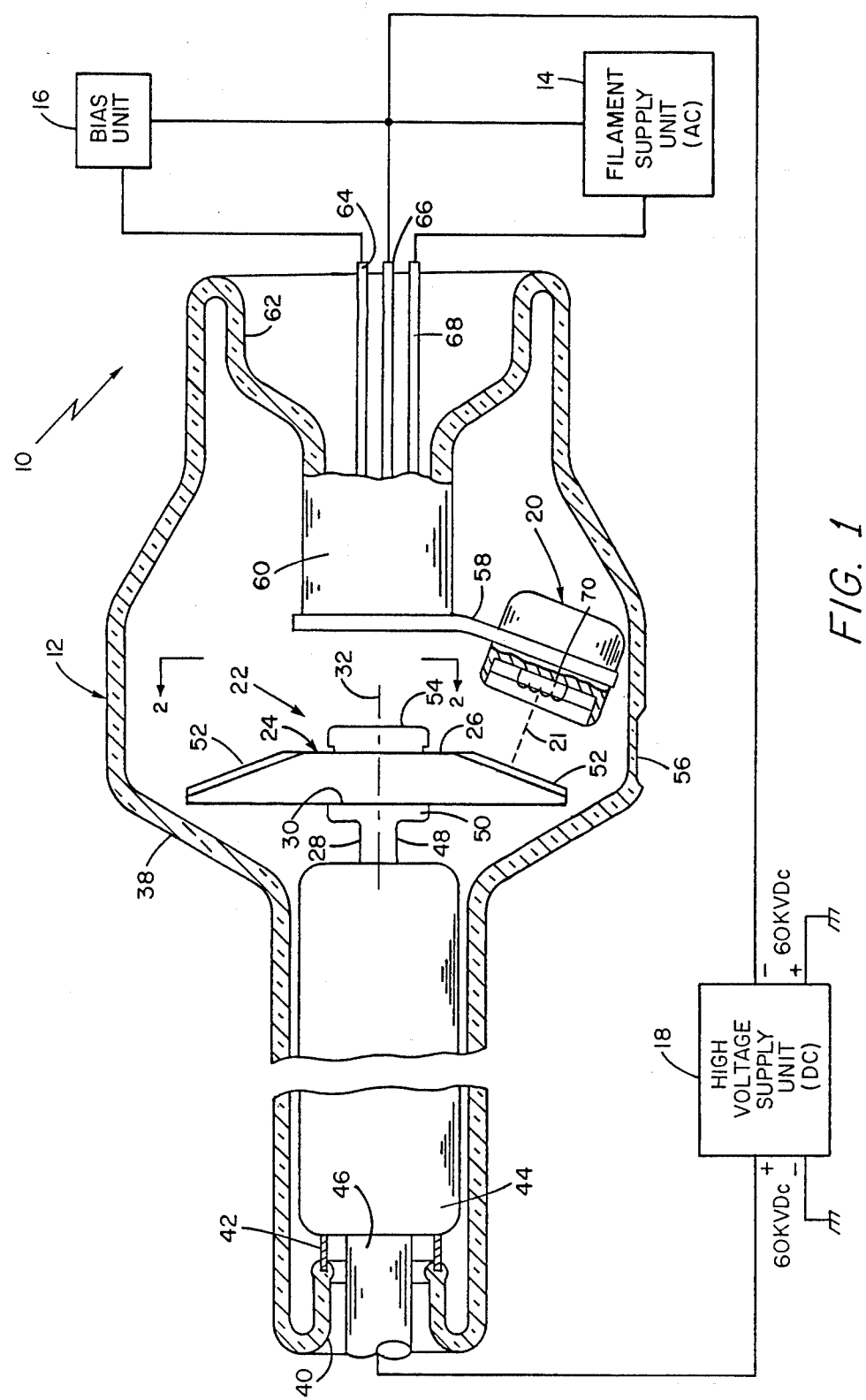
FIG. 1 is a partially sectioned view and schematic diagram of an x-ray apparatus incorporating the x-ray target assembly of the present invention fabricated by the process of the present invention.

Referring now to FIG. 1, there is shown therein an x-ray generating apparatus 10 including an x-ray tube 12 electrically connected as shown to an adjustable filament supply unit 14, and adjustable bias unit 16, and an adjustable high voltage supply unit 18. X-ray tube 12 comprises cathode assembly 20 and rotatable x-ray target assembly 22 of the present invention, the details of which will be described in detail hereinafter. Suffice it here to say that rotatable x-ray target assembly 22 comprises a target member 24, here including anode electrode 26, and a support member 28 having a mounting surface 30 disposed transversely to an axis of rotation 32 of x-ray target assembly 22, target member 24 being disposed on mounting surface 30. Target member 24 is secured on support member 28 by securing means comprising brazing material 36 (see FIG. 2) disposed between target member 24 and mounting surface 30, a first portion of brazing material 36 being diffused into target member 24 and a second portion of brazing material 36 being diffused into support member 28 using the bonding process of the present invention, such diffusion bonding process being performed at temperatures below the melting temperature of the brazing material, thereby preventing vapor deposition of the brazing material on the inner surface of x-ray tube envelope 38. Such process is described in detail hereinafter. With such arrangement, target member 24 is substantially prevented from slipping on support member 28 during rotation of x-ray target assembly 22, thereby preventing target member 24 from becoming imbalanced on support member 28, and thus substantially eliminating vibration of target member 24 during the operation of x-ray generating apparatus 10.

X-ray tube 12 comprises a generally tubular envelope 38 which may be made of dielectric material, such as lead-free glass, for example. One end of envelope 38 is provided with a reentrant portion 40 which is peripherally sealed to one end of a metal collar 42. The other end of collar 42 is hermetically attached, in a well-known manner, to one end of a conventional anode rotor 44 which is made of electrically conductive material, such as copper, for example. A shaft 46 of rotor 44 extends externally of the envelope 38 and provides terminal means for electrically connecting the rotor 44 to a positive terminal of adjustable high voltage supply unit 18.

Within the envelope 38, support member 28 comprises an electrically conductive stem portion 48 made of refractory material, such as an alloy of titanium-zirconium-molybdenum (TZM), for example, such stem 48 extendinq longitudinally from the internal end of rotor 44 and being in electrical communication therewith. Additionally, support member 28 includes nut 54, here also made from a refractory metal such as TZM. Support member 28 also comprises flange portion 50, here made of TZM and being integrally formed on the opposite end of stem 48 from rotor 44. Flange portion 50 terminates in mounting surface 30. Fixedly attached to support member 28 against flange mounting surface 30 of stem 48 is target member 24, comprising anode disk 26. Anode disk 26 is disposed perpendicularly to rotational axis 32 and is rotated by rotor 44 in a well-known manner. The inner end of anode disk 26 has a frusto-conical configuration for providing a sloped annular target surface or focal track 52 adjacent the outer periphery thereof. Focal track 52 is made of a material, such as tungsten, for example, or a tungsten-rhenium alloy, which readily emits x-rays when bombarded by high energy electrons incident thereon from filamentary cathode assembly 20 along path 21. However, other portions of anode disk 26 are here made of suitable electrically conductive, refractory material, such as TZM, for example, for purposes to be discussed. TZM nut 54 engages a threaded terminal portion (see FIG. 2) of TZM stem 48 and rests against the upper surface of TZM anode disk 26.

Although anode disk 26 is rotatable, a portion of focal track 52 is continuously positioned in spaced, opposing relationship with cathode assembly 20 and is sloped toward a radially aligned x-ray transparent window 56 in envelope 38. Cathode assembly 20 is fixedly supported on a suitably angled end portion of a hollow arm 58 which has an opposing end portion hermetically attached to one end of an axially disposed support cylinder 60. The other end of support cylinder 60 is circumferentially sealed to a reentrant portion 62 of envelope 38, out of which hermetically extend electrical terminal lead members 64, 66 and 68, respectively.

Terminal lead members 64, 68 are electrically connected to respective output terminals of bias unit 16 and filament supply unit 14. Another output terminal of bias unit 16 is connected electrically to terminal lead member 66 in common with an output terminal of filament supply unit 14 and the negative output terminal of high voltage unit 18. Within envelope 38, terminal lead members 64, 66 and 68 extend through the hollow arm 58 and into the cathode assembly 20. Leads 66, 68 supply an AC signal, riding on the high negative voltage output of high voltage suply unit 18 (for example −60 KVDC with respect to ground) across the ends of cathode filament 70 in cathode assembly 20. Filament 70 is heated by such AC signal and responds by emitting electrons therefrom. High voltage supply unit 18 also supplies a high positive voltage with respect to ground (for example, +60 KVDC) to shaft 46. Such positive potential is coupled to anode disk 26 by electrically conductive shaft 46, rotor 44 and stem 48. Thus, a high potential difference (for example, 120 KVDC) exists between anode disk 26 and filamentary cathode 70, drawing the electrons emitted by filament 70 toward anode disk 26. Filament 70 is insulatingly mounted in an electrically conductive body 72 of cathode assembly 20. Lead 64 couples a suitable DC voltage, for example negative with respect to the −60 KVDC signal applied on lead 66, to "bias" body 72 in a well-known manner in order to focus the electrons emitted by filament 70 in an electron beam along path 21, such beam being incident on focal track 52 of anode disk 26, which emits x-rays through window 56 in response to such electron bombardment.

During operation, rotor 44, which is the rotor component of an induction motor (not shown), rotates target member 24 at a predetermined speed, for example 10,000 RPM, about rotational axis 32. Thus, the focused electron beam strikes continually different portions of annular focal track 52 as such focal track revolves about axis 32, thereby allowing regions of focal track 52 which have been bombarded by the high-energy electron beam time to cool before the electron beam is again incident on such regions. Without such rotation, the electron beam would quickly burn through tungsten-rhenium focal track 52, resulting in cessation of x-ray emission from tube 12. Due to the high rotational speed attained by target assembly 22, such assembly must be precisely balanced to prevent vibration which, in addition to varying the regions on focal track 52 on which the electron beam is incident and thereby destabilizing x-ray emission from tube 12, will destroy x-ray tube 12 if the vibration is severe. Thus, target member 24 is secured onto stem 48 of support member 28, and small amounts of material are removed, such as by grinding, until assembly 22 is balanced when rotating. However, if target member 24 later "slips", that is, changes position on support member 28, target assembly 22 will be imbalanced and will vibrate during rotation. Such often occurs in prior art x-ray tubes in which the target member is secured onto the stem using only a nut, such as nut 54.

Figure 2:
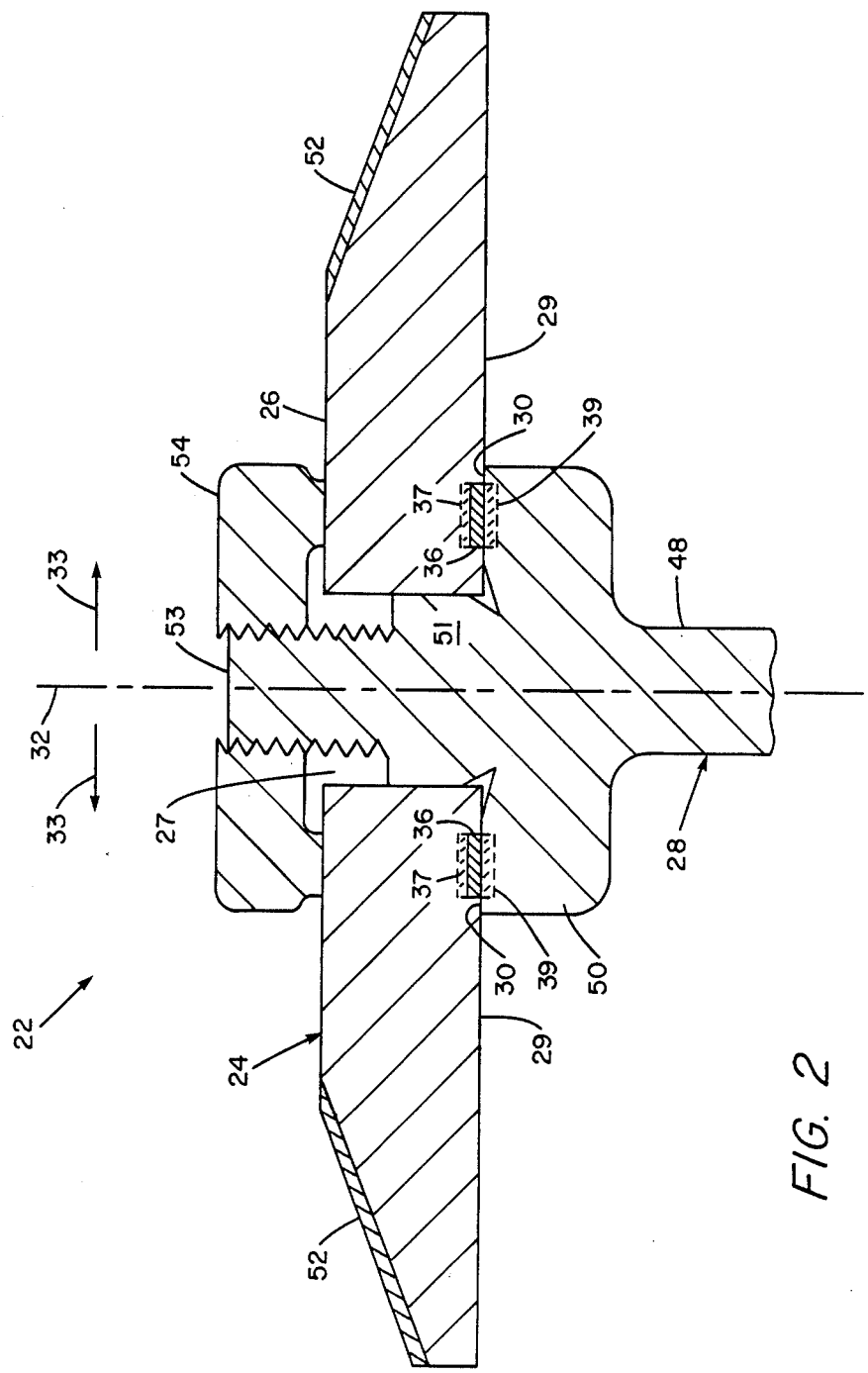
FIG. 2 is an enlarged, cross-sectional view of the x-ray target assembly of FIG. 1.

Referring now to FIG. 2, the present invention, which comprises a process for securing target member 24 to support member 28 to substantially eliminate the above-described slippage, as well as an x-ray target assembly 22 utilizing such process, will be described. FIG. 2 is a cross-sectional view of target member 24 and support member 28, enlarged for clarity. Support member 28, here made from IZM, comprises stem 48 having flange portion 50 formed thereon. Flange 50 includes a generally circular mounting surface 30 on which target member 24 is supported, as will be described. Neck portion 51 of support member stem 48 extends beyond flange 50 and terminates in threaded end portion 53. Thus, support member 28 is adapted to receive and support target member 24, here comprising anode disk 26 made from TZM and having a central bore 27 disposed therein. Neck portion 51 is selected to have a diameter slightly smaller than that of central bore 27. Anode disk 26 fits over stem end portion 53 and snugly around neck 51, the bottom surface 29 thereof resting on mounting surface 30.

Before anode disk 26 is placed on support member 28, a layer of brazing material 36, here in the shape of a ring or washer, is disposed on mounting surface 30. Brazing material 36 comprises relatively low melting temperature metal, such as an alloy of palladium-cobalt, Pd-Co, (melting temperature, approximately 1238° C.) or palladium-nickel, Pd-Ni, (1230° C. melting temperature). It is noted that the melting temperature of TZM is relatively high, approximately 2600° C. Anode disk 26 is set onto support member 28 and is centered thereon about rotational axis 32 by the tight fit between neck 51 and central bore 27. Threaded end portion 53 of support member 28 is adapted to receive nut 54, here made from TZM. Nut 54 is tightened on end portion 53 and engages the upper surface of anode disk 26, exerting downward pressure an anode disk 26 against brazing washer 36 and flange 50 mounting surface 30. Such mechanical force compresses the relatively soft braze material between the relatively hard TZM disk 26 and TZM flange 50, thereby deforming braze washer 36 into a thin member and allowing the bottom surface 29 of disk 26 to become closely juxtaposed with mounting surface 30. It is noted here that the size of braze washer 36 is selected to prevent such washer 36 from extending laterally beyond the outer edges of flange 50 when such washer 36 is mechanically compressed in the manner described above.

After TZM nut 54 has been securely tightened as above described, target member 24 is heated. Here, such target heating is accomplished by applying electrical power, in the form of an electron beam, to focal track 52 of anode disk 26. Alternately, anode disk 26 may be heated inductively by exposing disk 26 to a high-frequency electromagnetic field. Preferably, target assembly 22 is not rotated during application of electrical power to anode disk 26, thereby minimizing any chance of target member 24 slipping on support member 28. Therefore, the electron beam applied to focal track 52 has relatively low power in order to avoid damaging focal track 52. The heat generated in anode disk 26 dissipates through disk 26 by thermal radiation and by conduction down stem 48 of support member 28. However, flange 50 and nut 54 are not heated to the same extent as anode disk 26, since the former experience a rise in temperature only due to conduction from disk 26, while heat is generated directly within anode disk 26 due to the electron beam or the inductive heating applied thereto. Thus, target member 26 undergoes mechanical expansion in response to such heat to a greater degree than do either cooler stem flange 50 or nut 54. Thus, flange 50 and nut 54 restrict the amount of mechanical expansion of target member 24, creating very high mechanical forces at the interfaces between target member anode disk 26 and flange 50 and nut 54. In other words, compressed braze washer 36, disposed at the interface between bottom surface 29 of target member 24 and mounting surface 30 of support member 28, is compressed still further by the restricted expansion of anode disk 26 against flange 50. Further, such added compression occurs at an elevated temperature due to the heating of target member 24 (and of support member 28, by conduction). Such combination of high mechanical forces and heat (for example 1000° C.), diffuse braze material 36 both into an adjacent region 37 of target member anode disk 26 and into an adjacent region 39 of support memter flange 50, forcing bottom surface 29 and mounting surface 30 into contact. Thus, a very strong mechanical bond is formed between TZM target member 24 and TZM support memter 28, securing anode disk 26 thereon and substantially preventing target member 24 from slipping on support member 28 during the high rotation rates of target assembly 22 experienced during the operation of x-ray apparatus 10.

It has been found that during operation of x-ray apparatus 10, target assembly 22 reaches temperatures in the range of 1300° C. Typical brazing materials, such as the Pd-Co and Pd-Ni alloys used in the present invention as materials for brazing washer 36, have melting temperatures equal to or lower than the operating temperature range of target assembly 22, and also have relatively high vapor pressures, for example, on the order of $10^{-4}$ Torr, at such high operating temperatures. Note that the vapor pressure of TZM is much lower, less than $10^{-11}$ Torr. Thus if such brazing marerial is exposed within x-ray tube 12 during the operation thereof, the high vapor pressures thereof allow metallic deposits comprising the brazing metal to form on the inner surfaces of vacuum tube 38. Thus, arcing would occur between the high electrical potential elements (i.e. the anode and cathode) and the metallic deposits on the sides of tube 38, thereby degrading the performance of x-ray tube 12.

The process of the present invention and the target assembly 22 manufactured thereby solve the above-discussed problem by diffusing brazing material 36 into TZM target member 24 and TZM support member 28 at temperatures below the melting point of such brazing material. That is, target member 24 is heated to temperatures below the melting temperature of braze material 36, the high mechanical forces generated at the interface betwen anode disk 26 and flange 50 in response to such heating diffusing brazing material 36 completely into regions 37, 39 at a temperature below the melting point of such braze material 36. For example, Pd-Co, one of the suitable materials for brazing material 36, is approximately 1238° C. During the diffusion bonding process described above, target member 24 is heated (such as by applying electrical power to focal track 52) only to about 1000° C. However, the high mechanical forces generated at the interface between target member lower surface 29 and support member mounting surface 30, due to the restriction by flange 50 and nut 54 of the expansion of anode disk 26, in combination with such temperature completely diffuse the brazing material into the TZM metal of disk 26 and flange 50. It is noted that once the brazing material diffuses into regions 37, 39 of TZM disk 26 and flange 50, respectively, the melting temperature of the diffused regions 37, 39 is a temperature higher than the melting temperature of the brazing material (e.g. 1238° C. if Pd-Co is used) but lower than that of TZM (2600° C.). When the diffusion-bonded target assembly 22 is elevated to very high temperatures of 1300° C. or more during the normal operation of x-ray tube 12, brazing material 36 is present only as part of the diffusion bond between target member 24 and support member 28. To put it another way, during x-ray operation of tube 12, the Pd-Co or Pd-Ni brazing material 36 is not present within x-ray tube 12 except for in regions 37, 39, where such brazing material 36 is diffused with TZM. TZM has a very low vapor pressure, less than $10^{-11}$ Torr at 1300° C. Thus, the diffusion metal in regions 37, 39 has a like low vapor pressure, precluding deposition of brazing material 36 on the surfaces of x-ray tube 12. Therefore, in the present invention, a brazing process for an x-ray target assembly as well as an x-ray target assembly 22 manufactured thereby, is provided wherein the target member 24 is brazed to the support member 28 at temperatures below the melting point of the brazing material 36, thereby preventing vapor deposition of such brazing material 36 on the inside surfaces of x-ray tube 12. With such arrangement, a diffusion bond is provided between target member 24 and support member 28 which substantially prevents the anode disk 26 of target member 24 from slipping on stem 48 of support member 28, thereby inhibiting anode disk 26 from becoming imbalanced and vibrating on stem 26 during rotation.

It is noted that the brazing material 36 may alternately be disposed at another interface between target member 24 and support member 28. For example, the brazing material may be disposed on the sides of support member neck 51, or the walls of central bore 27 which contact such neck 51. To avoid the above-identified metallic deposition, however, the brazing material should not be located on portions of the walls of central bore 27 which are not in contact with neck 51 when anode disk 26 is secured onto support member 28, since in such case, the brazing material would remain in its original state (i.e. Pd-Co or Pd-Ni) and would not diffuse into target member 24 or support member 28. Alternately, the brazing material may be disposed at the interface between TZM nut 54 and TZM anode disk 26, or on the threads of nut 54 or end portion 53, and hence at the interface between TZM nut 54 and TZM end portion 53, taking care in either instance to ensure that the brazing material is covered by such TZM members and not left exposed (thereby avoiding metallic deposition of such brazing material on the sides of x-ray tube 38).

During the operation of x-ray tube 12, the rotation of target assembly 22 produces a mechanical force on target member 24 radially outward from rotational axis 32, that is, centrifugal force. Such centrifugal force is represented by arrows 33 in FIG. 2 and tends to urge anode disk 26 away from neck 51. A little thought reveals that by disposing brazing material 36 on mounting surface 30, and hence forming the diffusion bond at the interface between target member bottom surface 29 and support member mounting surface 30, centrifugal force 33 puts shear stress on such diffusion bond. On the other hand, such centrifugal force 33 would put tension or compression stress on a diffusion bond formed between support member neck 51 and the walls of anode disk central bore 27. As is known, a diffusion bond is less likely to fail when subject to shear stress rather than tension or compression stress. Hence, the diffusion bond illustrated in FIG. 2 and formed between mounting surface 30 and disk bottom surface 29 is preferred and also overcomes the tension-compression stress problems associated with the target assembly described in the Background of the Invention section, in which the stem of the support member comprised brazing material.

Having described preferred embodiments of the present invention, alternate embodiments may become apparent to those skilled in the art without departing from the spirit of the present invention. For example, brazing materials other than Pd-Co or Pd-Ni may be used. Also, suitable materials other than TZM may be used as the material for support member 28, nut 54 and target member 24. Other shapes for target member 24 may also be employed. Accordingly, it is understood that the present invention is to be limited only by the scope of the appended claims.

What is claimed is:

1. An x-ray target assembly comprising:
   an x-ray target member;
   means for supporting the x-ray target member; and
   means for securing said target member to said supporting means, said securing means comprising a non-refractory metal brazing material disposed at an interface between a first surface of the target member and a first surface of the supporting means and substantially completely diffused into the target member and supporting means, with a first portion of the brazing material being diffused into the first surface of the target member and a second portion of the brazing material being diffused into the first surface of the supporting means, the first surfaces being in contact at the interface therebetween.

2. The x-ray target assembly of claim 1 wherein the x-ray target member and the supporting means each comprise a refractory metal.

3. The x-ray target assembly of claim 1 wherein the supporting means comprises a stem portion and a flange portion disposed transversely to such stem portion, the x-ray target member being disposed on the flange portion and the stem portion extending through an opening in the x-ray target member.

4. The x-ray target assembly of claim 3 wherein said brazing material is disposed at an interface between the x-ray target member and the flange portion.

5. The x-ray target assembly of claim 4 wherein said brazing material is disposed at an interface between the x-ray target member and the stem portion.

6. The x-ray assembly of claim 3 wherein the stem portion is threaded and said supporting means further comprises means for receiving said threaded stem portion, said receiving means engaging the x-ray target member.

7. The x-ray target assembly of claim 6 wherein said brazing material is disposed at an interface between the receiving means and the x-ray target member.

8. The x-ray target assembly of claim 7 wherein said brazing material is disposed at an interface between the receiving means and the threaded stem portion.

9. The x-ray target assembly of claim 2 wherein said brazing material comprises an alloy of palladium and cobalt.

10. The x-ray target assembly of claim 2 wherein said brazing material comprises an alloy of palladium and nickel.

11. An x-ray tube comprising:
   (a) an evacuated envelope; and
   (b) a rotatable x-ray target assembly disposed within the envelope and rotatable about an axis of rotation, the x-ray target assembly comprising:
   (i) an x-ray target member having an opening disposed therethrough;
   (ii) a support member having: a mounting surface disposed transversely to the axis of rotation, a lower surface of the target member being disposed on the mounting surface; and, a threaded stem extending from said mounting surface through the opening of the target member;
   (iii) means for receiving the threaded stem, said receiving means engaging an upper surface of the target member; and
   (iv) means for securing the target member to the support member, said securing means comprising a non-refractory metal brazing material disposed between the lower surface of the target member and the mounting surface; the brazing material being substantially completely diffused into the lower surface of the target member and the mounting surface of the support member, with said lower surface and mounting surface being in substantial contact.

12. The x-ray tube of claim 11 wherein the x-ray target member and the support member comprise TZM.

13. The x-ray target assembly of claim 12 wherein said brazing material comprises an alloy of palladium and cobalt.

14. The x-ray target assembly of claim 12 wherein said brazing material comprises an alloy of palladium and nickel.

15. An x-ray target assembly comprising:
   an x-ray target member having an x-ray target surface disposed thereon;
   means for supporting the x-ray target member; and
   means for securing said target member to said supporting means, said securing means comprising a member comprising a non-refractory metal diffusing material disposed at an interface between a first surface of the target member and a first surface of the supporting means, the diffusing material member being substantially completely diffused into the first surface of the target member and the first surface of the supporting means, with the first surfaces being in contact at the interface therebetween.

16. The x-ray target assembly of claim 15 wherein said diffusing material comprises an alloy of palladium and cobalt.

17. The x-ray target assembly of claim 15 wherein said diffusing material comprises an alloy of palladium and nickel.

* * * * *